United States Patent
Fige et al.

(10) Patent No.: US 9,619,212 B2
(45) Date of Patent: Apr. 11, 2017

(54) PROVIDING CODE, CODE GENERATOR AND SOFTWARE DEVELOPMENT ENVIRONMENT

(71) Applicants: Peter Fige, München (DE); Farid Riahi, München (DE)

(72) Inventors: Peter Fige, München (DE); Farid Riahi, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/263,093

(22) Filed: Apr. 28, 2014

(65) Prior Publication Data

US 2014/0325472 A1  Oct. 30, 2014

(30) Foreign Application Priority Data

Apr. 29, 2013  (EP) ..................... 13165774

(51) Int. Cl.
 *G06F 9/44*  (2006.01)
 *G06F 9/45*  (2006.01)

(52) U.S. Cl.
 CPC .................. *G06F 8/35* (2013.01); *G06F 8/40* (2013.01); *G06F 8/44* (2013.01); *G06F 8/447* (2013.01); *G06F 8/31* (2013.01)

(58) Field of Classification Search
 CPC ................................................ G06F 8/10–8/54
 See application file for complete search history.

(56) References Cited

U.S. PATENT DOCUMENTS

| | | | | |
|---|---|---|---|---|
| 8,826,248 | B2* | 9/2014 | Adendorff et al. | ........... 717/140 |
| 2004/0088688 | A1* | 5/2004 | Hejlsberg et al. | ........... 717/143 |
| 2005/0183073 | A1* | 8/2005 | Reynolds | .................. G06F 8/30 717/141 |
| 2007/0174812 | A1* | 7/2007 | Yang | ......................... G06F 8/51 717/114 |
| 2008/0189689 | A1* | 8/2008 | Tramontana et al. | ........ 717/143 |
| 2008/0270920 | A1* | 10/2008 | Hudson | ..................... G06F 8/34 715/763 |
| 2008/0275910 | A1 | 11/2008 | Molina-Moreno et al. | |
| 2009/0089234 | A1* | 4/2009 | Sturrock | ................... G06F 8/61 706/45 |

(Continued)

OTHER PUBLICATIONS

Czarnecki, K. et al., "Feature-based survey of model transformation approaches", 2006, pp. 621-645.*

(Continued)

*Primary Examiner* — Thuy Dao
*Assistant Examiner* — Christopher Franco
(74) *Attorney, Agent, or Firm* — Lempia Summerfield Katz LLC

(57) ABSTRACT

A method for generating code in a predefined programming language based on an optimization problem is provided. The method includes reading a model of the optimization problem, and identifying references to external data sources in the model. The external data sources are external to the model. The method also includes generating the code. The code includes a program representation of the model. The code includes read and/or write accesses to the external data sources. A corresponding code generator and a software development environment are also provided.

20 Claims, 5 Drawing Sheets

(56) References Cited

U.S. PATENT DOCUMENTS

| | | | |
|---|---|---|---|
| 2009/0240480 A1* | 9/2009 | Baramov | G05B 13/048 703/6 |
| 2009/0313613 A1* | 12/2009 | Ben-Artzi et al. | 717/137 |
| 2010/0057417 A1* | 3/2010 | Hudson, III | G06F 8/34 703/7 |
| 2010/0058289 A1* | 3/2010 | Hudson, III | G06F 8/20 717/105 |
| 2010/0083223 A1* | 4/2010 | Chouinard | G06F 8/20 717/110 |
| 2010/0161289 A1* | 6/2010 | Stojanovic | G06F 17/10 703/2 |
| 2011/0088011 A1* | 4/2011 | Ouali | 717/105 |
| 2011/0296391 A1* | 12/2011 | Gass | G06F 8/72 717/168 |
| 2012/0216016 A1* | 8/2012 | Koehl et al. | 712/30 |
| 2013/0282146 A1* | 10/2013 | Lu | G05B 19/042 700/29 |
| 2014/0059517 A1* | 2/2014 | Premkumar et al. | 717/105 |
| 2014/0250429 A1* | 9/2014 | Greiner et al. | 717/133 |

OTHER PUBLICATIONS

Kelly, Steven, "Domain-Specific Modeling 76 cases of MDD that works", 2009, pp. 1-48.*

Czarnecki, Krzysztof, et al., "Classification of Model Transformation Approaches", 2003, pp. 1-17.*

Sendall, Shane, et al., "Model Transformation—the Heart and Soul of Model-Driven Software Development", 2003, pp. 1-12.*

Saada, Hajer, et al., "Recovering Model Transformation Traces using Multi-Objective Optimization", 2013, pp. 688-693.*

Fei, Yunsi, et al., "Energy-Optimizing Source Code Transformations for Operating System-Driven Embedded Software", 2007, pp. 2:1-2:26.*

European Search report for European Application No. EP13165774, mailed Sep. 16, 2013, with English Translation.

Harrington et al; "Model-driven engineering of planning and optimisation algorithms for pervasive computing environments"; Pervasive and mobile computing; vol. 7; No. 6; pp. 705-726; ISSN: 1574-1192; DOI: 10.1016/J.PMCJ.2011.09.005; XP028121068; 2011; Oct. 1, 2011.

Harrington; "Model-Driven Engineering of Planning and Optimisation Algorithms for Pervasive Computing Environments"; Pervasive computing and communications (PERCOM), IEEE International conference; pp. 172-180; ISBN: 978-1-4244-9530-6; DOI: 10.1109/PERCOM.2011.5767582; XP; 2011; Mar. 21, 2011.

Hunkeler et al; "A Quality-of-Information-Aware Framework for Data Models in Wireless Sensor Networks"; Mobile Ad Hoc and sensor systems, IEEE International conference; pp. 742-747; ISBN:978-1-4244-2574-7; XP031354866; 2008; US; Sep. 29, 2008.

Munson, et al., "Mesh shape-quality optimization using the inverse mean-ratio metric"; Mathematical programming, Springer Verlag; vol. 110; No. 3; pp. 561-590; ISSN: 1436-4646; XP019494834; 2006; DE; Aug. 1, 2006.

Yang et al; "A Design Flow for Building Automation and Control Systems"; Real-Time Systems Symposium (RTSS), IEEE; 31st IEEE; pp. 105-116; ISBN: 978-0-7695-4298-0; DOI: 10.1109/RTSS.2010.26; XP031885994; 2010; Nov. 30, 2010.

\* cited by examiner

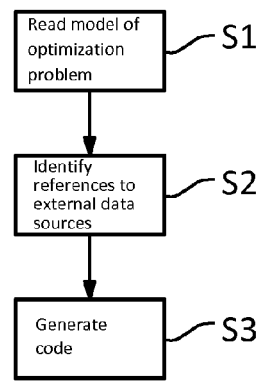
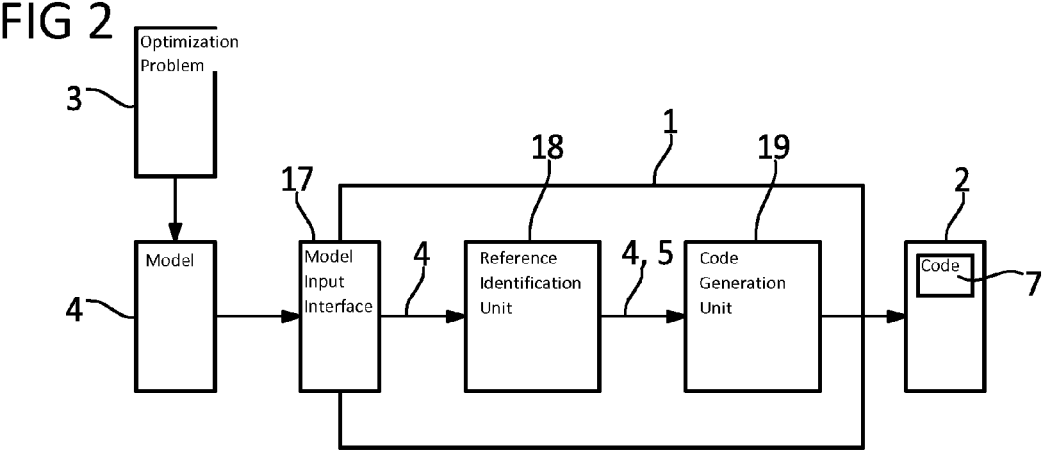
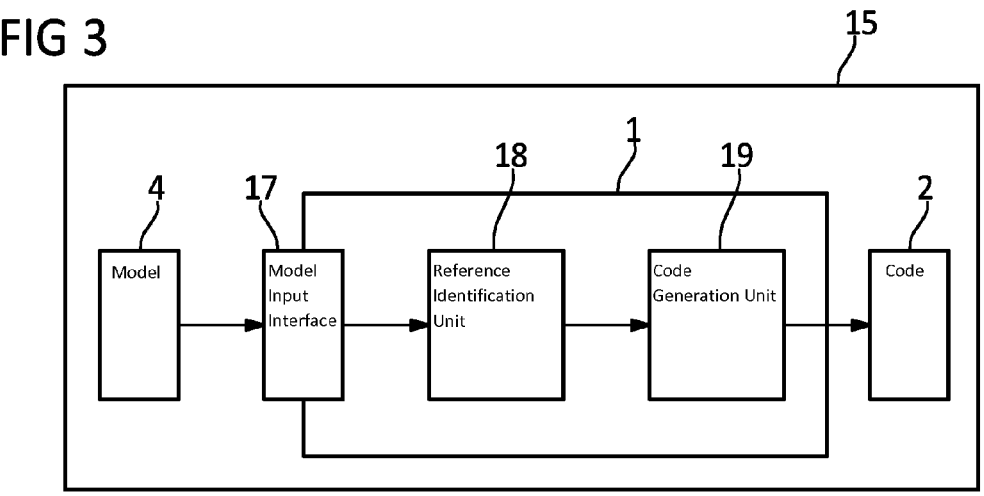

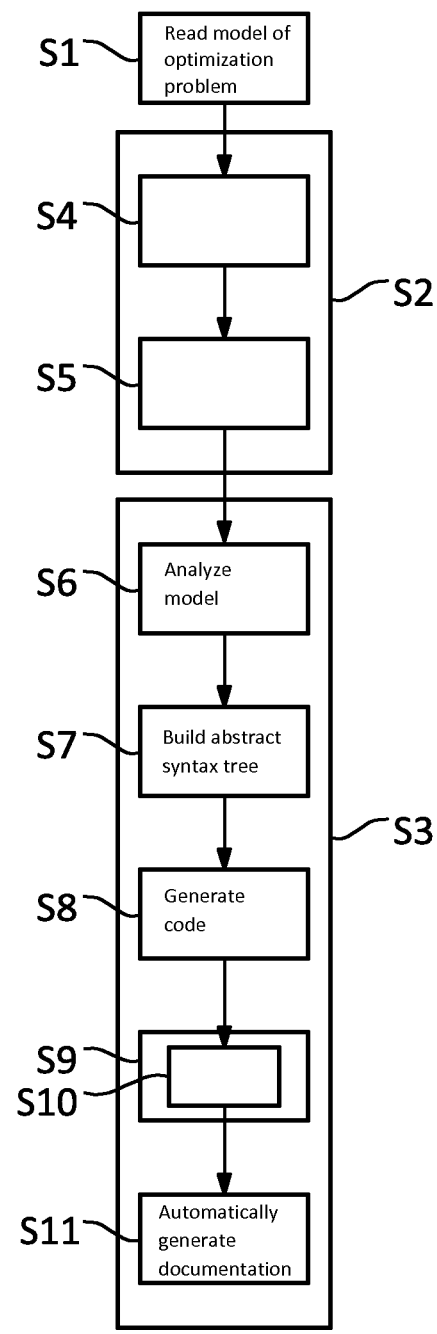

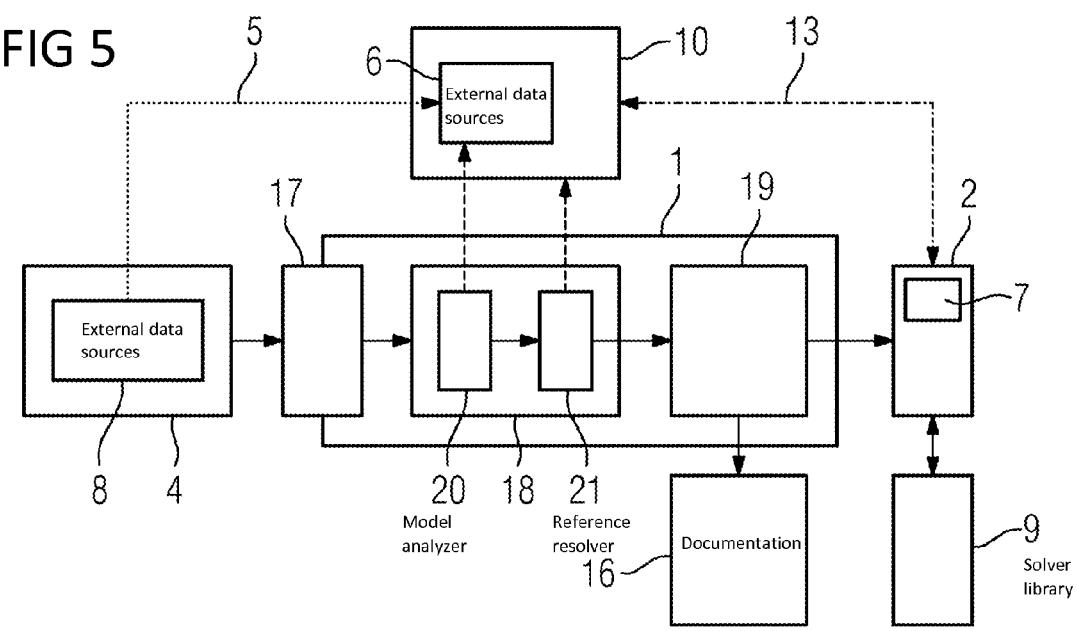

PROVIDING CODE, CODE GENERATOR AND SOFTWARE DEVELOPMENT ENVIRONMENT

This application claims the benefit of EP 13165774.4, filed on Apr. 29, 2013, which is hereby incorporated by reference in its entirety.

TECHNICAL FIELD

The present embodiments relate to providing code in a predefined programming language based on an optimization problem.

BACKGROUND

Although applicable to any system that is used to develop software components, the present embodiments will be described in combination with software development environments.

In modern electronic applications (e.g., industrial applications like production line controllers), complex software programs are used to control the electronic applications.

In some applications, the application controller is not programmed with a static control algorithm, but with a complex dynamic control program. Such complex dynamic control programs may include an optimization problem that is continuously solved in real time by the application controller using a solver integration that connects the application controller to a solver library for solving such optimization problems.

The development of such control software is a very time consuming task.

An optimization problem may be modelled with the underlying optimization application in mind. A software engineer then uses the model of the optimization problem as a basis for implementation of the solver integration.

The software developer manually codes the solver integration, which is used to integrate the optimization problem into the control program and couple the control program with a predefined solver library. When manually coding the solver integration, the software developer codes the solver integration in a predefined programming language (e.g., C++, C#, Java or the like) and for a specific solver library (e.g., CPLEX, Gurobi, SCIP/Soplex, GLPK or the like).

In complex applications, the solver integration may easily include thousands of lines of code. In such complex applications, the manual coding is a time consuming, and error prone process and the quality of the resulting code depends on the quality of the respective software engineer.

The solver integration may realize the optimization problem in its entirety, and the realization of the optimization problem should be verifiable. With a conventional development process that includes manual coding of thousands of lines of solver integration code, this is not possible.

In modern development processes, the model of the optimization problem is to be adapted to evolving application needs. Therefore, the solver integration also is to be adapted to the changing model with every model iteration. If this adaptation is not concluded with high accurateness, the model and the solver integration will drift apart from each other.

Because every solver library provides a proprietary solver interface, the software developer is to specifically program the solver integration for one solver library that is used in the respective project.

If for any reason, in such an application, one solver library is exchanged for another solver library, the solver integration is to be rewritten from scratch.

SUMMARY AND DESCRIPTION

The scope of the present invention is defined solely by the appended claims and is not affected to any degree by the statements within this summary.

Better integration of optimization problems into the software development process is to be provided.

In a first aspect, a method for providing code in a predefined programming language based on an optimization problem is provided. The method includes reading a model of the optimization problem, and identifying references to external data sources in the model. The external data sources are external to the model. The method also includes generating the code. The code includes a program representation of the model. The code includes read and/or write accesses to the external data sources.

In a second aspect, a code generator for generating code for an optimization problem is provided. The code generator includes a model input interface configured to read a model of the optimization problem, and a reference identification unit configured to identify references to external data sources in the model. The data sources are external to the model. The code generator also includes a code generation unit configured to generate the code. The code includes a program representation of the model in a predefined programming language. The code includes read and/or write accesses to the external data sources.

In a third aspect, a software development environment including a code generator for generating code for an optimization problem is provided. The code generator includes a model input interface configured to read a model of the optimization problem, and a reference identification unit configured to identify references to external data sources in the model. The data sources are external to the model. The code generator also includes a code generation unit configured to generate the code. The code includes a program representation of the model in a predefined programming language. The code includes read and/or write accesses to the external data sources.

Manual coding of a solver integration with thousands of lines of code is a complex, time consuming and error prone task that makes it difficult to fully integrate optimization problems into software projects.

One or more of the present embodiments uses this knowledge to provide a model driven approach of integrating optimization problems into software projects.

Accordingly, one or more of the present embodiments provide a method for integrating models of optimization problems into software projects. The software projects are written in a predefined programming language such as, for example, C++, C#, Java or the like.

To integrate the models into the software projects, one or more of the present embodiments generate code in the programming language of the respective software project from a model of a respective optimization problem. The code may be integrated into existing or new software projects.

In order to integrate the code generated from the models with the respective software project, one or more of the present embodiments allow the model to include references to data sources of the respective software project, which may be accessed by the logic defined by the models.

The references to the data sources, which are defined in the model, are then included in the generated code as read/or write accesses to the data sources.

One or more of the present embodiments allow software developers to provide model based descriptions of optimization problems, from which executable code may be generated. The executable code may be executed, for example, in a control system, and may access all data sources of the respective control system (e.g., in real time).

One or more of the present embodiments provide software developers with a very easy to manage tool for developing optimization problems that may then be transferred to real world control systems.

One or more of the present embodiments also allow efficient code generation based on the respective models without risking the introduction of coding errors by a software engineer.

One or more of the present embodiments also make sure that the generated code exactly represents the model of the optimization problem. Any changes to the model may instantly be translated into code by re-executing the method according to one or more of the present embodiments.

One or more of the present embodiments allow easy adaptation of the generated code to different application requirements. For example, the program language of the code may be changed by simply re-executing the method according to one or more of the present embodiments with a new target programming language.

In one embodiment, the model includes a mixed integer linear program. This allows describing the optimization problem in a standardized and human readable format.

In a possible embodiment, the mixed integer linear program is provided in a domain specific language for formulating mixed integer linear programs (e.g., AMPL and/or OPL and/or an AMPL or OPL based dialect). Using well known domain specific languages makes it possible to use well known development tools and reduces training needs for new developers.

In one embodiment, the code is generated to include a program code that, when compiled and executed, solves the optimization problem described by the model using a predetermined solver library for solving optimization problems. Using existing solver libraries reduces the effort of code generation because the solver logic is already implemented by the solver libraries and does not need to be generated for every project.

In an embodiment, the solver library is a solver library such as, for example, CPLEX, Gurobi, SCIP/Soplex, GLPK or the like.

In one embodiment, the act of identifying references to external data sources includes the acts of identifying the external data sources and identifying the respective locations of the external data sources.

Identifying external data sources and corresponding respective locations in a model allows using different external data source having different locations as sources of information for the optimization problem.

The locations of the data sources may be locations of objects and corresponding methods, which may be defined in classes of the current source code or be provided externally by corresponding libraries (e.g., dynamic linked libraries (DLLs) or the like). This, for example, allows referencing a function in a DLL that will provide real time data of the respective control system for which the software is developed.

In one embodiment, generating the code includes analyzing the model based on a corresponding grammar for the model, building an abstract syntax tree representation of the model, and generating the code in the predefined programming language based on the abstract syntax tree.

An abstract syntax tree provides an intermediate representation of the respective model and allows flexible generation of code in different programming languages.

In one embodiment, generating the code includes binding the code to the external data sources by including references to the respective locations of the external data sources in the code.

In one embodiment, including references includes including references to data sources defined by or in a software development environment in which the method is executed. In the software development environment, the software for, for example, a control system is developed. If the references include references to the data sources of this software, the generated code may be integrated into the software for, for example, the control system with little effort.

In one embodiment, generating the code includes automatically generating documentation for the code or the model. Providing documentation together with the code allows software engineers to revise the generated code with little effort.

In one embodiment, the code is generated when the model is changed. This allows maintaining consistency between the model and the generated code.

BRIEF DESCRIPTION OF THE DRAWINGS

FIG. 1 shows a flow diagram of an embodiment of a method;

FIG. 2 shows a block diagram of an embodiment of a code generator;

FIG. 3 shows a block diagram of an embodiment of a software development environment;

FIG. 4 shows a flow diagram of another embodiment of a method;

FIG. 5 shows a block diagram of another embodiment of a code generator;

The elements of the drawings are not necessarily drawn to scale relative to each other. Like reference numerals designate corresponding similar parts.

DETAILED DESCRIPTION

Figure 6:
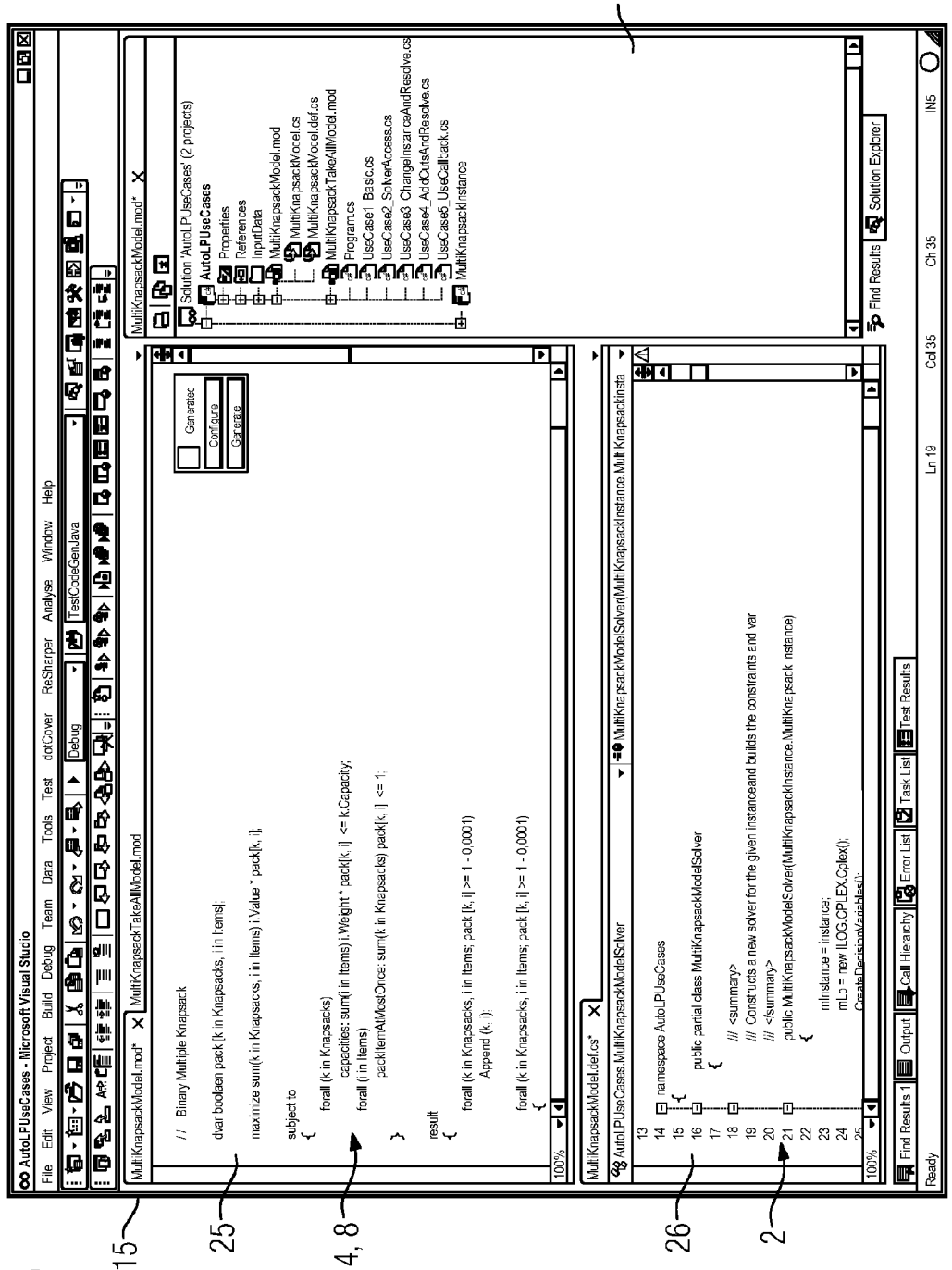
FIG. 6 shows a screenshot of another embodiment of a software development environment.

FIG. 1 shows a flow diagram of an embodiment of a method.

With the method according to one or more of the present embodiments, code 2 is generated in a predefined programming language based on an optimization problem 3.

In act S1 of the method, a model 4 of the optimization problem 3 is read.

In act S2, references to external data sources 6 in the model 4 are identified. The external data sources 6 are external to the model 4 of the optimization problem 3.

In act S3 of the method, the code 2 is generated. The code 2 is generated to include a program representation 7 of the model 4. The code also includes read and/or write accesses to the external data sources 6.

In an embodiment, the external data sources 6 may be variables 6 in a program in which the generated code 2 is then integrated. The external data sources 6 may also be function names 6 in corresponding libraries (e.g., dynamic linked libraries (DLLs), or the like).

In an embodiment, the code 2 is generated in the same programming language as the program that contains the variables 6.

In another embodiment, the code 2 may be generated in any programming language like, for example, C#, C++, Java or the like.

Reading the model 4 may be performed by reading the model 4 from a file on a hard disk. In another embodiment, the model 4 may be read from a central model repository (e.g., a network server, a database server or the like).

In another embodiment, the model is provided together with the data sources in a software development environment.

FIG. 2 shows a block diagram of an embodiment of a code generator 1.

The code generator 1 includes a model input interface 17 that is coupled to a reference identification unit 18. The reference identification unit 18 is coupled to a code generation unit 19.

The input interface 17 is configured to read a model 4 that represents an optimization problem 3, and provide the model 4 to the reference identification unit 18.

The reference identification unit 18 is configured to identify references 5 to external data sources in the model 4. The data sources are external to the model 4. The reference identification unit 18 provides the model 4 and the identified references 5 to the code generation unit 19.

The code generation unit 19 is configured to generate the code 2. The generated code 2 includes a program representation 7 of the model 4 in a predefined programming language. The generated code 2 includes read and/or write accesses to the external data sources.

FIG. 3 shows a block diagram of an embodiment of a software development environment 15.

The software development environment 15 includes a code generator 1 according to FIG. 2.

In an embodiment, the software development environment 15 is a software development environment 15 that is provided for developing software projects.

In an embodiment, the code generator 1 is included in the software development environment 15 as a plugin that extends the functionality of the software development environment 15. In another embodiment, the code generator 1 is provided as integral part of the software development environment 15.

If the code generator 1 is included in the software development environment 15 as a plugin, the code generator 1 may be used with a plurality of different software development environments 15.

In an embodiment, the code generator 1 is configured to generate code 2 that accesses variables that are defined in a software project in the software development environment 15 for reading and writing.

FIG. 4 shows a flow diagram of another embodiment of a method.

The method of FIG. 4 is based on the method of FIG. 1. The second act S2 of identifying references 5 to external data sources 6 in the model 4 includes identifying the external data sources 6, and identifying the respective locations 10 of the external data sources 6.

In an embodiment, code 2 is generated to include a program code that, when compiled and executed, solves the optimization problem 3 described by the model 4 using a predetermined solver library 9 for solving optimization problems.

The solver library may be a solver library such as, for example, CPLEX, Gurobi, SCIP/Soplex, GLPK or the like.

The act S3 of generating the code 2 includes the act S6 of analysing the model 4 based on a corresponding grammar 11 for the model 4.

The grammar 11 is a description of the structure and all elements of the model 4 that allows analysing the model and a corresponding function.

The act S3 of generating the code 2 also includes the act S7 of building an abstract syntax tree 12 representation of the model 4. The abstract syntax tree 12 is built analyzing the model 4 using the grammar 11.

An abstract syntax tree 12 (e.g., syntax tree 12) is a tree representation of the syntactic structure of the model 4. In the abstract syntax tree 12, each node denotes a construct occurring in the model 4.

The abstract syntax tree 12 does not represent every detail appearing in the model. Grouping parentheses, for example, are implicit in the tree structure. Also, a construct like an if-condition-then expression may be represented by a single node with two branches.

The act S3 of generating the code 2 also includes the act S8 of generating the code 2 in the predefined programming language based on the abstract syntax tree 12.

Also, the act S3 of generating the code 2 includes the act S9 of binding the code 2 to the external data sources 6 by including references 13 to the respective locations 10 of the external data sources 6 in the code 2.

The act S9 of including references 13 includes the act S10 of including references 13 to data sources 6 defined by or in the software development environment 15.

The act S3 of generating the code 2 also includes the acts S11 of automatically generating documentation 16 for the code 2 and/or the model 4.

FIG. 5 shows a block diagram of an embodiment of a code generator 1.

The code generator 1 in FIG. 5 is based on the code generator 1 of FIG. 2.

In FIG. 5, the model 4 includes a mixed integer linear program 8. In another embodiment, the model 4 includes a linear program. The mixed integer linear program 8 in FIG. 5 includes references 5 to data sources 6 that are referenced by the logic that is described in the model 4.

The reference identification unit 18 of FIG. 5 also includes a model analyzer 20 and a reference resolver 21.

The model analyzer 20 is configured to identify the external data sources 6 that are referenced in the model 4, and the reference resolver 21 is configured to identify the respective locations 10 of the external data sources 6 that are referenced in the model 4.

The code generation unit 1 of FIG. 5 is configured to analyze the model 4 based on a corresponding grammar for the model 4, build an abstract syntax tree of the model 4, and generate the code 2 in the predefined programming language based on the abstract syntax tree.

The code generation unit 19 is further configured to bind program representation 7 of the model 4 to the external data sources 6 by including references 13 to the respective locations 10 of the external data sources 6 in the code 2.

The references 13 to external data sources 6 may be embodied as references to data sources 6 defined by or in a software development environment in which the code generator 1 is executed.

The code generation unit 19 is further configured to automatically generate documentation 16 for the code 2 or the model 4.

Also, the code generation unit 19 is configured to generate code 2 including a program representation 7 of the model 4 that, when compiled and executed, solves the optimization problem 3 using a predetermined solver library 9 for solving optimization problems for solving the optimization problem 3 described by the model 4.

The code generation unit 19 is configured to generate code 2 every time the model 4 is changed.

FIG. 6 shows a screenshot of an embodiment of a software development environment 15.

The software development environment 15 includes three main sections 25-27. A first section 25 is situated in the upper half and stretches from the left to about ⅔s of the window of the software development environment 15. The second section 26 is situated below the first section 25, and a third section 27 stretches from the top to the bottom on the right ⅓ of the window of the software development environment 15.

In the first section 25, a model 4 is shown as a mixed integer linear program 8 that is written in a domain specific language for describing mixed integer linear programs 8. In one embodiment, this language is AMPL, OPL, an AMPL or OPL based dialect or any other domain specific language.

In FIG. 6, the model 4 in the first section 25 describes a binary multi-knapsack problem, which is a well-known problem in combinatorial optimization. In FIG. 6, only the first part of the mixed integer linear program 8 of the model 4 is shown. In total, the binary multiply knapsack problem 4 is described in 23 lines of code.

In the second section 26, the generated code 2, which was generated by one or more of the present embodiments from the model 4 in the programming language C#, is displayed. The generated code 2 includes a solver integration that uses a solver library to solve the binary multiply knapsack problem described by the model 4.

The generated code 2 includes 274 lines of code and has a drastically reduced readability compared to the original model 4 in the first section.

In the third section 27 of the screenshot of the software development environment 15, all elements that the software development environment 15 uses to manage a software project are listed in a tree view. In the tree view, the software development environment 15 also lists "References" and "InputData", which in one embodiment, may be referenced by the generated code 2.

In FIG. 6, it becomes clear how one or more of the present embodiments reduce the work load on software engineers, which may only deal with the model 4 or the mixed integer linear program 8. The mixed integer linear program 8 only includes, for example, 23 lines of code instead of directly programming the C# solver integration, which includes 274 lines of code, for example.

Figure 7:
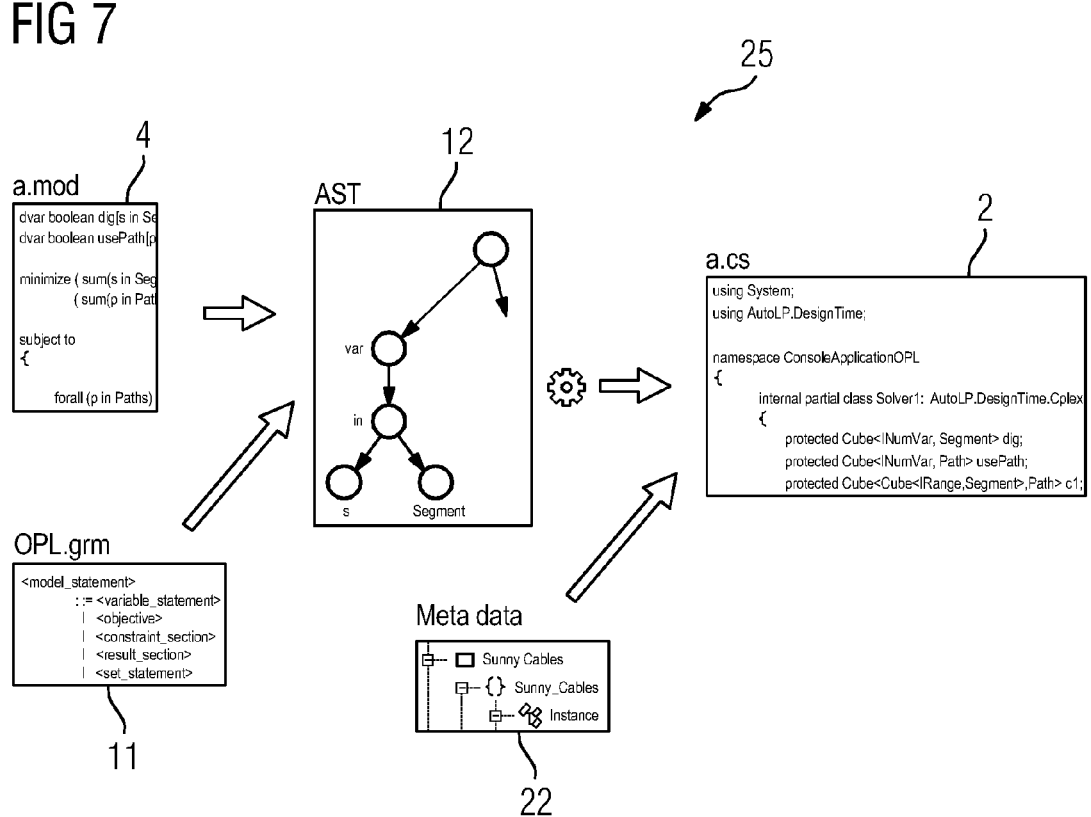
FIG. 7 shows a block diagram of one embodiment of the code generation process.

FIG. 7 shows a block diagram of one embodiment of the code generation process 25.

The code generation process 25 includes reading a model 4, which in FIG. 7 is embodied as a file called "a.mod", and a grammar 11, which in FIG. 7 is embodied as a file called "OPL.grm". The grammar 11 describes the grammar of the OPL programming language, which is a domain specific programming language for describing optimization problems.

From the model 4 and the grammar 11, an abstract syntax tree 12 is generated. The abstract syntax tree 12 represents the model 4 in an abstract and language independent way.

From the abstract syntax tree 12 and project specific meta-data 22, the code 2 is generated.

In an embodiment, the meta-data includes the definition of all types, which objects are referred to in the model (e.g., in c#, this meta-data may be given by .NET-assemblies (managed DLLs); in c++, the meta-data is provided by header files (".h" files)).

In one embodiment, the method according to one or more of the present embodiments is used to optimize the production process in a factory that produces light emitting diodes.

The optimization problem includes the complete production process starting from the optimization of waver warehouse stock, waver assignment to product lines, product line balancing to Customer assignment of lot numbers, etc.

A model 4 is then built according to the optimization problem and references to the factory data sources (e.g., a warehouse data system and production line control systems) are established.

From the model 4, the code generator 1 according to one or more of the present embodiments generates code 2 that includes a solver integration and solves the underlying optimization problem.

When the factory control system is loaded with the control software, which includes the generated code 2, the factory control is always optimized according to the optimization problem 3.

In a factory, the use of a control software that includes code 2 including a solver integration according to one or more of the present embodiments allows reducing production costs, reducing defects in production, speeding up customer order processing and the like.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment. Various changes may be made in the function and arrangement of elements described in an exemplary embodiment without departing from the scope as set forth in the appended claims and corresponding legal equivalents. This application is intended to cover any adaptations or variations of the specific embodiments discussed herein.

In the foregoing detailed description, various features are grouped together in one or more examples for the purpose of streamlining the disclosure. The above description is intended to be illustrative, and not restrictive. The above description is intended to cover all alternatives, modifications and equivalents, as may be included within the scope of one or more of the present embodiments. Many other examples will be apparent to one skilled in the art upon reviewing the above specification.

Specific nomenclature used in the foregoing specification is used to provide a thorough understanding of one or more of the present embodiments. However, it will be apparent to one skilled in the art in light of the specification provided herein that the specific details are not required in order to practice the invention. Thus, the foregoing descriptions of specific embodiments of the present invention are presented for purposes of illustration and description. The foregoing descriptions are not intended to be exhaustive or to limit the invention to the precise forms disclosed. Many modifications and variations may be provided in view of the above teachings. The embodiments were chosen and described in order to best explain the principles of the invention and corresponding practical applications to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. The terms "first," "second," and "third," etc., are used merely as labels, and are not intended to impose numerical requirements on or to establish a certain ranking of importance of corresponding objects.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing code in a predefined programming language based on an optimization problem for a control system, the method comprising:
reading a model of the optimization problem for the control system;
identifying references to external data sources in the model, the external data sources being external to the model and providing real time data for the control system, the identifying of the references to the external data sources in the model comprising identifying the external data sources, and identifying respective locations of the external data sources; and
generating the code,
wherein the code comprises a program representation of the model,
wherein the code comprises read, write, or read and write accesses to the external data sources, and
wherein generating the code comprises:
analyze the model based on a corresponding grammar for the model;
building an abstract syntax tree representation of the model; and
generating the code in the predefined programming language based on the abstract syntax tree.

2. The method of claim 1, wherein the model comprises a mixed integer linear program.

3. The method of claim 2, wherein the mixed integer linear program is provided in a domain specific language for formulating mixed integer linear programs.

4. The method of claim 3, wherein the domain specific language comprises A Mathematical Programming Language (AMPL), Optimization Programming Language (OPL), AMPL or OPL based dialect, or a combination thereof.

5. The method of claim 1, wherein generating the code comprises generating the code to include a program code that, when compiled and executed, solves the optimization problem described by the model using a predetermined solver library for solving optimization problems.

6. The method of claim 1, wherein generating the code comprises binding the code to the external data sources, the binding comprising including references to the respective locations of the external data sources in the code.

7. The method of claim 6, wherein including references comprises including references to objects defined by or in a software development environment in which the method is executed.

8. The method of claim 1, wherein generating the code comprises automatically generating documentation for the code or the model.

9. The method of claim 1, wherein the code is generated when the model is changed.

10. The method of claim 1, wherein the code comprises write, or read and write accesses to the external data sources.

11. A code generator for generating code for a optimization problem, the code generator comprising:
a model input interface stored in a memory and configured to read a model of the optimization problem for an industrial control system;
a reference identification unit configured to identify references to external data sources in the model, the external data sources being external to the model and providing real time data for the industrial control system, the identification of the references to the external data sources in the model comprising identification of the external data sources, and identification of respective locations of the external data sources; and
a code generation unit configured to generate the code,
wherein the code comprises a program representation of the model in a predefined programming language,
wherein the code comprises read, write, or read and write accesses to the external data sources, and
wherein the code generation unit is configured to:
analyze the model based on a corresponding grammar for the model;
build an abstract syntax tree representation of the model; and
generate the code in the predefined programming language based on the abstract syntax tree.

12. The code generator of claim 11, wherein the model comprises a mixed integer linear program.

13. The code generator of claim 12, wherein the mixed integer linear program is provided in a domain specific language for formulating mixed integer linear programs.

14. The code generator of claim 13, wherein the domain specific language comprises A Mathematical Programming Language (AMPL), Optimization Programming Language (OPL), an AMPL or OPL based dialect, or a combination thereof.

15. The code generator of claim 11, wherein the code generation unit is configured to generate code comprising a program code that, when compiled and executed, solves the optimization problem described by the model using a predetermined solver library for solving optimization problems.

16. The code generator of claim 11, wherein the code generation unit is configured to bind the code to the external data sources by including references to the respective locations of the external data sources in the code.

17. The code generator of claim 16, wherein the code generator is configured to include references to external data sources defined by or in a software development environment in which the code generator is executed.

18. The code generator of claim 11, wherein the code generation unit is configured to automatically generate documentation for the code or the model.

19. The code generator of claim 11, wherein the code generation unit is configured to generate code when the model is changed.

20. A software development environment comprising:
a code generator for generating code for a optimization problem, the code generator comprising:
a model input interface stored in a memory and configured to read a model of the optimization problem for a control system;
a reference identification unit configured to identify references to external data sources in the model, the external data sources being external to the model and providing real time data for the control system, the identification of the references to the external data sources in the model comprising identification of the external data sources, and identification of respective locations of the external data sources; and
a code generation unit configured to generate the code,
wherein the code comprises a program representation of the model in a predefined programming language,
wherein the code comprises read, write, or read and write accesses to the external data sources, and
wherein the code generation unit is configured to:
analyze the model based on a corresponding grammar for the model;
build an abstract syntax tree representation of the model; and
generate the code in the predefined programming language based on the abstract syntax tree.

* * * * *